Dec. 3, 1963     C. A. REAMS     3,112,904
TAKE-OFF ASSISTING APPARATUS FOR ROTARY WING AIRCRAFT
Filed Aug. 18, 1961     3 Sheets-Sheet 1

INVENTOR
Clinton A. Reams
BY
ATTORNEY

Dec. 3, 1963 C. A. REAMS 3,112,904
TAKE-OFF ASSISTING APPARATUS FOR ROTARY WING AIRCRAFT
Filed Aug. 18, 1961 3 Sheets-Sheet 2

INVENTOR
Clinton A. Reams
BY
ATTORNEY

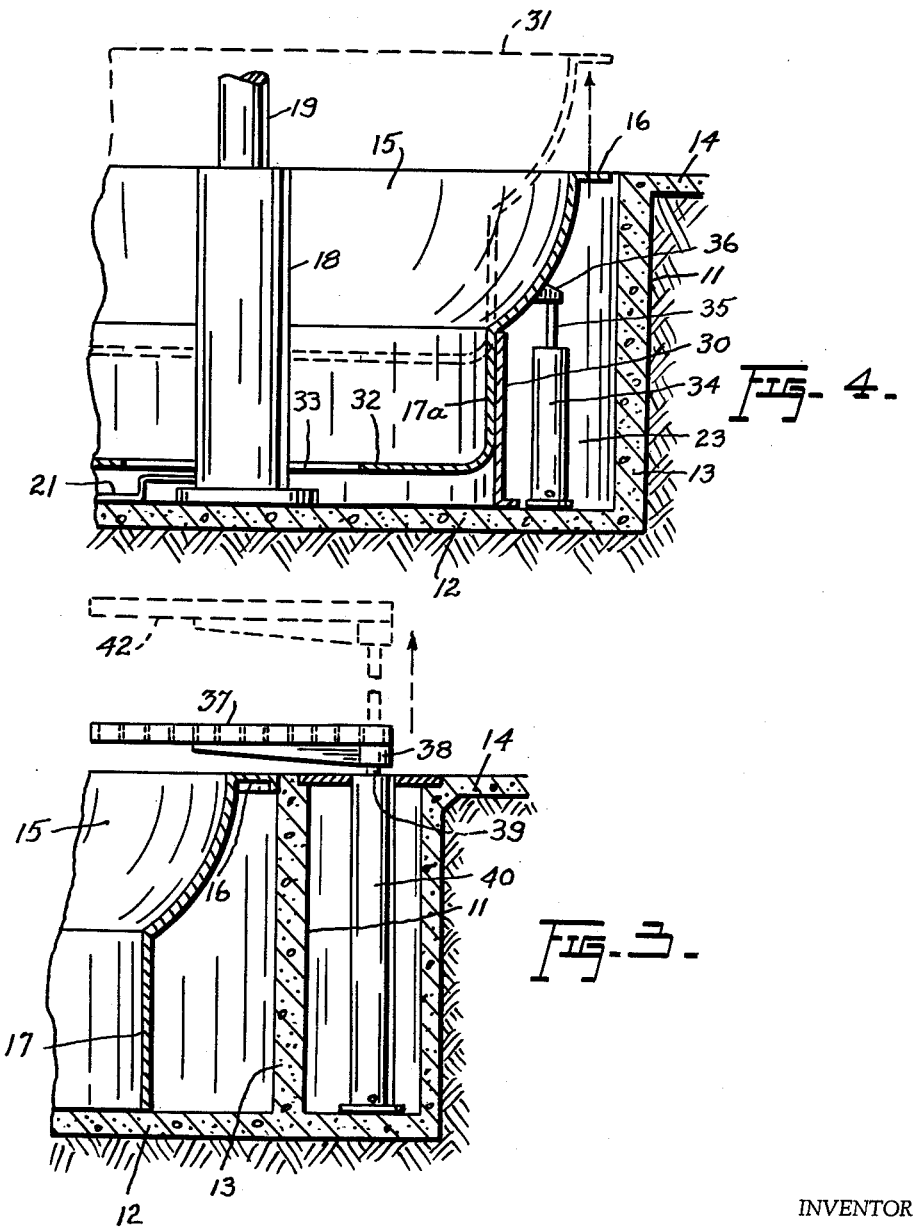

United States Patent Office 3,112,904
Patented Dec. 3, 1963

3,112,904
TAKE-OFF ASSISTING APPARATUS FOR ROTARY WING AIRCRAFT
Clinton A. Reams, P.O. Box 7734, Washington 4, D.C.
Filed Aug. 18, 1961, Ser. No. 132,372
16 Claims. (Cl. 244—63)

This invention relates to new and useful improvements in facilities for take-off and landing of aircraft, and the principal object of the invention is to materially assist the take-off of helicopters and other aircraft of the rotary wing type.

As is well known, rotary wing aircraft derive their sustenance and lift from the action of pitched blades of the rotating wing against the air, which action is countered by a reaction producing a downwash of air from the wing. When the aircraft is on or close to the ground, the force of the downwash against the ground produces what is generally known as a ground effect, wherein a column of what may be regarded as compressed air is built up between the ground and the rotating wing. This column of air not only cushions the aircraft but, by virtue of its higher than atmospheric density, it increases the lifting power of the wing by as much as 30 percent in comparison to operation at higher altitudes.

While the beneficial aspects of the ground effect have long been recognized, it is significant to note that the benefits of this effect are not fully realized when, as in conventional practice, the aircraft takes off from a resting position on the ground, inasmuch as the ground, while acting as a reaction surface for the base of the column of downwash, also inherently acts as a deflecting surface which causes the air at the base of the column to flow radially outwardly beyond the effective diameter of the rotating wing, so that a substantial portion of potential benefits of the ground effect is lost.

The present invention, therefore, primarily concerns itself with the provision of means whereby the benefits of the ground effect incident to the downwash of a rotating wing may be more fully and advantageously realized than in the past to materially increase the lift power of the wing. Briefly, these means consist of providing what may be called a well or a pit with a platform thereabove for supporting the aircraft, the well or pit being funnel shaped and of such diameter at the top relative to the effective diameter of the rotating wing as to receive the downwash of air from the wing, substantially minimize lateral dispersion of the downwash at the base thereof, and thus concentrate the downwash into a compressed air column capable of enhancing the lift and/or sustenance of the wing well beyond previously possible limits.

In conjunction with the foregoing, the invention also contemplates the provision of means for raising and lowering the aircraft supporting platform relative to the well or pit to afford optimum take-off conditions regardless of air temperature, such means being power-actuated and capable of raising the platform with the aircraft thereon during the initial stage of the take-off so that the aircraft in that stage is not wholly dependent upon the effect of its rotating wing for lift purposes.

In addition, the invention provides power-actuated means for varying the effective depth of the funnel shaped well or pit, whereby the well may be extended upwardly, if desired, to continue its service in concentrating the base of the downwash, even while raising of the platform and initial take-off of the aircraft take place.

Another important feature of the invention resides in the provision of means, in the form of a movable gangway, for delivering personnel and materiel to the aircraft on the supporting platform above the well. In instances where the materiel is in the form of a load to be suspended from a sling or hoist of the aircraft, means are also provided for raising the gangway with the load thereon during the initial stage of take-off, so that the aircraft is not burdened thereby until it becomes fully airborne.

Other objects, features and advantages of the invention will become apparent from the following description taken in conjunction with the accompanying drawings, wherein like characters of reference are used to designate like parts, and wherein:

FIGURE 4 is a fragmentary vertical sectional view, similar to that in FIGURE 1 but illustrating a modified embodiment of the invention; and FIGURE 5 is a diagrammatic view illustrating the difference in the lift effecting air columns of the invention and of the conventional ground effect.

Figure 1:
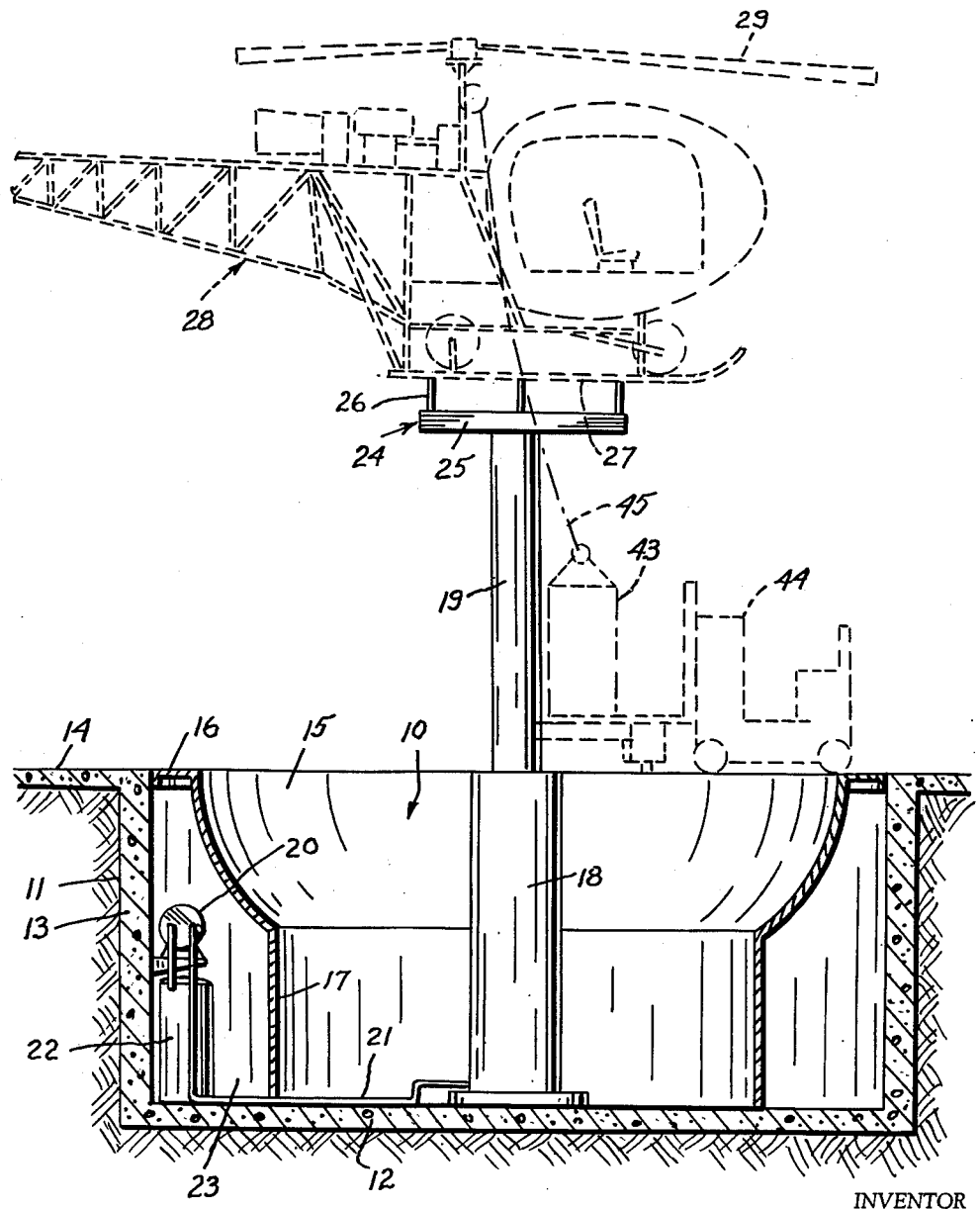
FIGURE 1 is a vertical sectional view of the take-off assist apparatus in accordance with the invention, this view being taken substantially in the plane of the line 1—1 in FIGURE 2.

Referring now to the accompanying drawings in detail, the take-off assisting apparatus in accordance with the invention comprises a funnel shaped well which is designated generally by the numeral 10 and for illustrative purposes is shown as being disposed in a circular pit 11 formed in the ground. The pit 11 is preferably provided with a concrete bottom 12 and a concrete circumferential wall 13, the upper edge of which is flush with paving material 14 on the ground surrounding the pit 11.

The well 10 has an open top flush with the paving material 14 and includes a smoothly curved concave or bowl-shaped upper portion 15 provided at its upper edge with an outturned annular flange 16, and an annular, straight-sided lower portion 17 which depends from the upper portion 15. The lower portion 17 is smaller in diameter than the upper portion 15 as shown, so that the upper portion constitutes what may be regarded as a funnel for the lower portion. The lower end of the lower portion 17 is closed by the bottom 12 of the pit 11.

Mounted centrally in the well 10 on the bottom 12 is a fluid operator 18 which may be either of the hydraulic or pneumatic type and includes a vertically reciprocable piston rod 19. The operator 18 is actuated by fluid under pressure from a motor-driven pump 20, the pump being connected by suitable lines 21 to the operator 18 and to a fluid reservoir 22 and suitable control means (not shown) being provided to permit the piston rod 19 to be raised and lowered, as desired. The pump 20 and reservoir 22 are conveniently housed in the space 23 between the peripheral wall 15, 17 of the well 10 and the circumferential wall 13 of the pit 11, as shown.

Rigidly mounted at the upper end of the piston rod 19 is a grid-like platform 24 consisting of a set of spaced parallel bars 25 and a set of spaced parallel cross members 26 which provide rests or supports for the usual landing skids 27 of a helicopter or other rotary wing aircraft 28.

The rotary wing of the aircraft is indicated at 29 and it is to be noted that the diameter of the well 10 at the upper edge of the wall portion 15 corresponds substantially to the effective diameter of the rotary wing 29 or is slightly smaller than that.

With the aircraft 28 resting on the platform 24 and the piston rod 19 lowered so that the platform is disposed adjacent the upper edge of the well 10, rotation of the wing 29 will produce a downwash of air into the concave or bowl shaped upper portion 15 of the well, whereby the downwash will be concentrated into the diametrically reduced lower portion 17 of the well, as is diagrammatically shown in the left-hand side of FIGURE 5. This concentration of the downwash by the well will materially minimize lateral dispersion of air at the bottom region of the downwash, such as occurs in conventional practice when the aircraft takes off from the ground, as shown in the right-hand side of FIGURE 5. As a result, the concentration of the downwash by the well of the invention builds up a column of compressed air below the rotating wing, and the density of air in this column not only effectively cushions the aircraft, but substantially increases the lifting power of the wing beyond the limits realized by the conventional ground effect.

To further assist the initial stage of the take-off, the fluid operator 18 may be actuated to raise the platform 24 with the aircraft thereon while the wing 29 is rotating, so that the wing is not solely relied upon to produce the lifting effect but is assisted by the raising movement of the platform during the initial take-off stage, until the platform is fully raised and the aircraft is fully airborne.

It will be noted that during this initial take-off stage the wing of the aircraft will become progressively higher above the well 10 and the height of the column of downwash will progressively increase. Since it is obviously desirable to maintain the downwash column as low as possible, means may be provided for raising the peripheral wall of the well more-or-less uniformly with the rising of the aircraft during the initial stage of take-off. Such means are shown in the modified embodiment of the invention illustrated in FIGURE 4, wherein it will be noted that the lower wall portion 17a of the well is slidably disposed in an annular wall or sleeve 30 mounted on the bottom 12 of the pit 11, whereby the concave upper wall portion 15 of the well may be raised above ground level as shown by the dotted lines 31, while the lower wall portion or skirt 17a of the well slides upwardly in the sleeve 30. The skirt 17a may be provided at its lower edge with an inturned annular flange 32 defining a central opening 33, but the bottom of the well is still constituted by the bottom 12 of the pit. In this context, the well may be regarded as having a greater depth when the wall portions 15, 17a are raised during the initial stage of the take-off, as already explained. Raising and lowering of the wall portions 15, 17a is effected by a plurality of fluid operators disposed at circumferentially spaced points in the space 23 of the pit, one of such operators being illustrated at 34 and having a vertically reciprocable piston rod 35 connected to a bracket 36 at the outside of the wall portion 15. The fluid operators 34 may also be actuated by the aforementioned pump 20.

It may be mentioned at this point that in both embodiments of the invention the piston rod 19 of the fluid operator 18 is rotatable so that the platform 24 may be turned in a horizontal plane to orient the aircraft in any desired direction.

Figure 2:
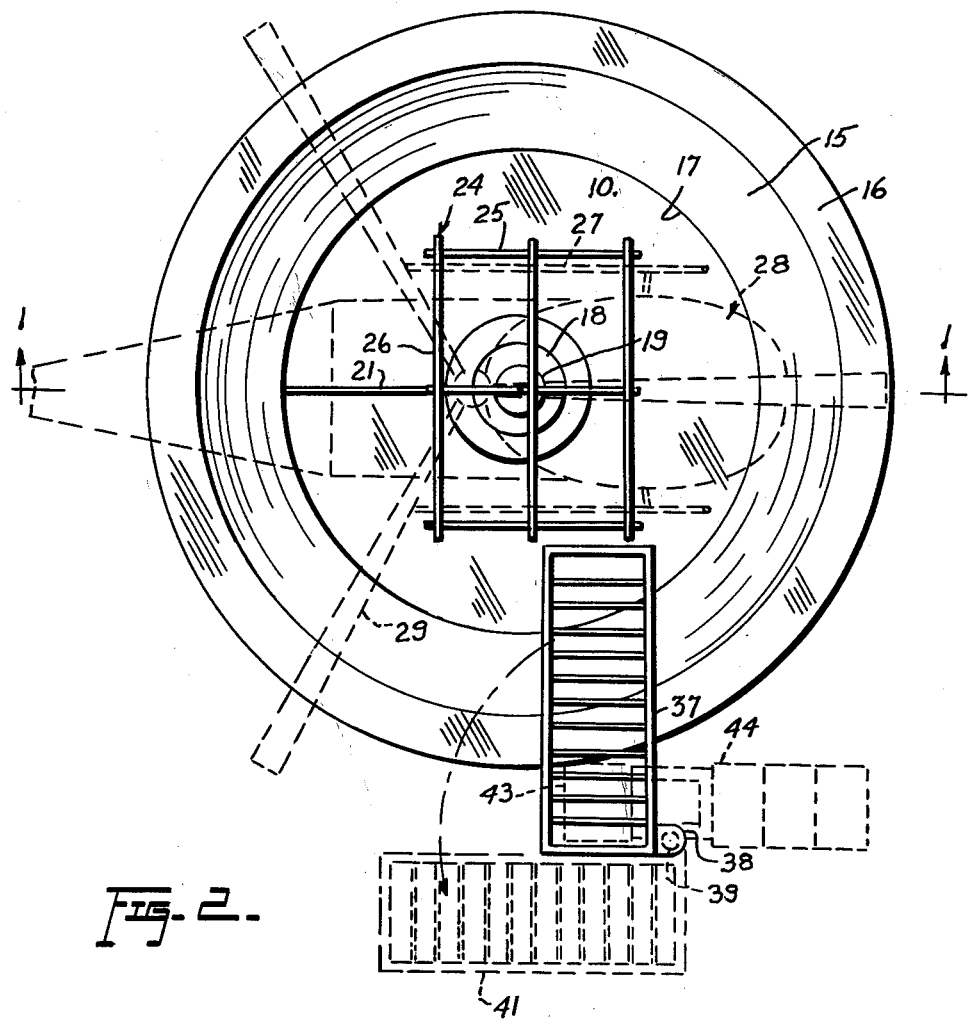
FIGURE 2 is a top plan view of the apparatus shown in FIGURE 1.
Figure 3:
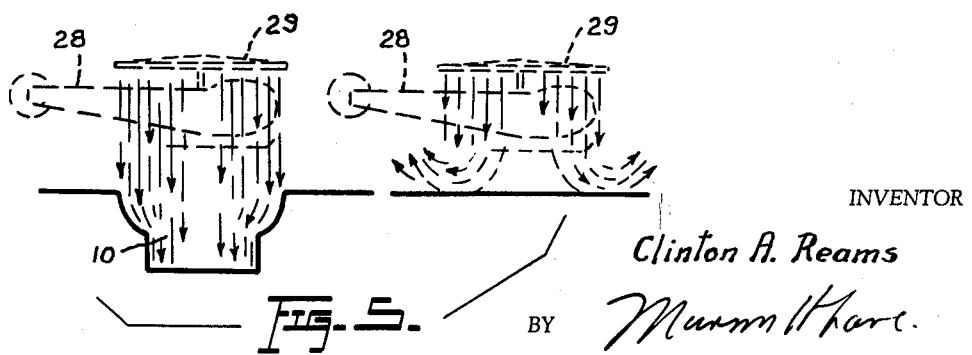
FIGURE 3 is a fragmentary vertical sectional view showing the power-actuated means of the gangway at one side of the well.

Referring now to FIGURES 2 and 3, it will be noted that a gangway 37 is provided for moving personnel and material to the platform 24 and aircraft 28 thereon. The gangway is provided at one side of one end portion thereof with a mounting sleeve 38 which is secured to the upper end of a vertically reciprocable piston rod 39 of a fluid operator 40 which is embedded in the ground at one side of the pit 11, as shown. The piston rod 39 is rotatable so that the gangway may be swung from its operative position over the well 10 to an inoperative position at one side of the well, indicated at 41 in FIGURE 2. Moreover, by actuation of the operator 40, the gangway may be raised from its lowered position adjacent the top of the well to a raised position as indicated at 42 in FIGURE 3.

A load 43 may be deposited on the gangway 37, as for example, by a conventional fork lift truck 44, and the usual sling or hoist cable 45 of the aircraft 28 may be connected to the load, as shown in FIGURE 1. Then, as the aircraft commences its take-off, the gangway with the load thereon may be raised by the operator 40 so that during the initial take-off stage the aircraft is not burdened by the load and the load is not picked up off the gangway until the aircraft is airborne.

The gangway 37 may be utilized in the embodiment of FIGURE 1 as well as in the embodiment of FIGURE 4 and it will be noted that like the platform 24, the gangway is of a slotted or grid-like construction, so that neither the platform nor the gangway offers appreciable resistance to air in the downwash.

Although the accompanying drawings show the well of the invention as being disposed in a pit in the ground, the well structure may be erected above ground level or mounted on a wheeled chassis if a take-off assisting apparatus of a mobile or portable nature is desired.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, falling within the spirit and scope of the appended claims.

What is claimed as new is:

1. A take-off assisting apparatus for rotary wing aircraft, comprising in combination a funnel shaped well having a bottom, a peripheral wall and an open top, and an aircraft supporting platform disposed centrally above said well, said top of said well being of such size relative to the rotary wing of the aircraft as to receive downwash of air from the wing and substantially minimize lateral dispersion of the downwash, whereby to concentrate the downwash into a column of compressed air and substantially enhance the lift effect of the wing.

2. The apparatus as defined in claim 1 together with means for raising and lowering said platform relative to said well.

3. The apparatus as defined in claim 1 together with means for varying the height of said peripheral wall whereby to selectively increase and decrease the depth of said well.

4. The apparatus as defined in claim 1 together with means for raising and lowering said platform relative to said well, and means for varying the height of said peripheral wall whereby to selectively increase and decrease the depth of the well.

5. The apparatus as defined in claim 1 together with a gangway extending above the peripheral wall of said well toward said platform.

6. An apparatus as set forth in claim 1 wherein the peripheral wall includes an enlarged smoothly curved concave upper portion and a lower skirt portion of reduced diameter.

7. A take-off assisting apparatus for rotary wing aircraft, comprising in combination a funnel shaped well having a bottom, a peripheral wall and an open top, a fluid operator provided at the center of said well and including a vertically reciprocable piston rod, and an aircraft supporting platform mounted at the upper end of said piston rod for raising and lowering movement relative to the well, said well being of such diameter relative to the rotary wing of the aircraft as to receive downwash of air from the wing and substantially minimize lateral dispersion of the downwash, whereby to concentrate the downwash into a column of compressed air and substantially enhance the lift effect of the wing.

8. The apparatus as defined in claim 7 wherein said peripheral wall of said well includes an upper bowl portion of a relatively large diameter and a depending skirt portion of a relatively small diameter.

9. The apparatus as defined in claim 7 wherein said peripheral wall of said well includes an upper bowl portion of a relatively large diameter, a skirt portion of a relatively small diameter depending from said bowl portion, and an annular wall member surrounding and slidably receiving said skirt portion therein, together with means for raising and lowering the bowl and skirt portions of said peripheral wall relative to said annular wall member, whereby to selectively increase and decrease the depth of said well.

10. The apparatus as defined in claim 7 wherein said well is disposed in a pit formed in the ground with the upper edge of said peripheral wall being substantially flush with ground level.

11. The apparatus as defined in claim 7 together with a gangway extending above the open top of said well from the outside of said peripheral wall toward said platform.

12. The apparatus as defined in claim 11 together with means for mounting said gangway for horizontal swinging movement between an operative position above said well and an inoperative position at one side of the well.

13. The apparatus as defined in claim 11 together with means for raising and lowering said gangway relative to said well.

14. The apparatus as defined in claim 11 together with means for mounting said gangway for horizontal swinging movement between an operative position above said well and an inoperative position at one side of the well, and means for raising and lowering said gangway relative to the well.

15. The apparatus as defined in claim 7 wherein said piston rod of said fluid operator is rotatable whereby the position of said platform relative to said well may be adjusted angularly in a horizontal plane.

16. A take-off assisting apparatus for rotary wing aircraft, comprising in combination a funnel shaped well having a bottom, a peripheral wall and an open top, and an aircraft supporting platform disposed centrally above said well, said top of said well being of such size relative to the rotary wing of the aircraft as to receive downwash of air from the wing and substantially minimize lateral dispersion of the downwash, whereby to concentrate the downwash into a column of compressed air and substantially enhance the lift effect of the wing, said peripheral wall including a smoothly curved concave enlarged upper portion and a lower skirt portion of reduced diameter.

References Cited in the file of this patent

UNITED STATES PATENTS

| | | |
|---|---|---|
| 2,415,071 | Brie | Feb. 4, 1947 |
| 2,421,512 | Leitch et al. | June 3, 1947 |
| 2,988,308 | Czerwinski | June 13, 1961 |